US012467749B1

(12) United States Patent
Li et al.

(10) Patent No.: US 12,467,749 B1
(45) Date of Patent: Nov. 11, 2025

(54) METHOD AND SYSTEM FOR ESTABLISHING SPACE-GROUND INTEGRATED REAL-TIME MONITORING REFERENCE FOR DAM DEFORMATION

(71) Applicants: Changjiang Spatial Information Technology Engineering Co., Ltd. (Wuhan), Hubei (CN); China Three Gorges Construction Engineering Corporation, Beijing (CN)

(72) Inventors: Shuangping Li, Hubei (CN); Bin Zhang, Hubei (CN); Zuqiang Liu, Hubei (CN); Hailong Huang, Beijing (CN); Yuanzhu Chen, Hubei (CN); Bo Shi, Hubei (CN); Zhao Tang, Hubei (CN); Huawei Wang, Hubei (CN); Zheng Wang, Hubei (CN); Yonghua Li, Hubei (CN); Yiming Chen, Hubei (CN)

(73) Assignees: Changjiang Spatial Information Technology Engineering Co., Ltd. (Wuhan), Wuhan (CN); China Three Gorges Construction Engineering Corporation, Beijing (CN)

( * ) Notice: Subject to any disclaimer, the term of this patent is extended or adjusted under 35 U.S.C. 154(b) by 0 days.

(21) Appl. No.: 19/276,192

(22) Filed: Jul. 22, 2025

(30) Foreign Application Priority Data

Sep. 23, 2024 (CN) .......................... 202411325524.8

(51) Int. Cl.
G01B 21/32 (2006.01)
G01S 19/14 (2010.01)

(52) U.S. Cl.
CPC .............. *G01B 21/32* (2013.01); *G01S 19/14* (2013.01)

(58) Field of Classification Search
CPC .............................. G01B 21/32; G01S 19/14
See application file for complete search history.

(56) References Cited

FOREIGN PATENT DOCUMENTS

| CN | 111551147 A | * | 8/2020 | ............. G06N 3/044 |
| CN | 111947562 A | * | 11/2020 | ............. G01S 19/14 |

(Continued)

OTHER PUBLICATIONS

1st Office Action of counterpart Chinese Patent Application No. 202411325524.8 issued on Oct. 31, 2024.

(Continued)

*Primary Examiner* — Manuel L Barbee

(57) ABSTRACT

The present disclosure provides a method and system for establishing a space-ground integrated real-time monitoring reference for dam deformation. The method includes: transmitting control instructions to a space-based Beidou system, a ground-based measurement robot system and a ground-based inverted plumb line system; obtaining a dynamic reference point position of a dam deformation area in real time through the space-based Beidou system; obtaining a spatial relative reference point position of the dam deformation area in real time through the ground-based measurement robot system; obtaining a static gravity reference point position of the dam deformation area in real time through the ground-based inverted plumb line system; and performing data fusion on the dynamic reference point position, the spatial relative reference point position, and the static gravity reference point position, and obtaining a monitoring reference value of the dam deformation area.

6 Claims, 5 Drawing Sheets

(56) References Cited

FOREIGN PATENT DOCUMENTS

| CN | 113532509 | A | 10/2021 |
| CN | 113916260 | B | 5/2023 |
| CN | 118654558 | A | 9/2024 |
| JP | 2019056603 | A | 4/2019 |
| KR | 10-2007-0021841 | A | 2/2007 |

OTHER PUBLICATIONS

Notice of Allowance of counterpart Chinese Patent Application No. 202411325524.8 issued on Nov. 22, 2024.

\* cited by examiner

METHOD AND SYSTEM FOR ESTABLISHING SPACE-GROUND INTEGRATED REAL-TIME MONITORING REFERENCE FOR DAM DEFORMATION

CROSS-REFERENCE TO RELATED APPLICATION

The present application claims priority from Chinese Patent Application No. 202411325524.8 filed on Sep. 23, 2024, the contents of which are incorporated herein by reference in their entirety.

TECHNICAL FIELD

The present disclosure belongs to technical field of dam deformation monitoring, and particularly relates to a method and system for establishing a space-ground integrated real-time monitoring reference for dam deformation.

BACKGROUND

As dams increase in size and service life, monitoring the health conditions and safety of dam structures becomes increasingly important. In conventional deformation monitoring technology, reference points are difficult to arrange and maintain, and stability of the reference points is affected especially in deformation-sensitive areas, leading to a decrease in reliability of monitoring data, and thus restricting accurate determination and prediction of dam deformation. With the maturity and development of the Beidou satellite navigation system (BDS) representative of global satellite navigation and positioning technology, a new solution has been provided for establishing monitoring references for dam deformation. It can provide all-weather and high-precision three-dimensional positioning information to contribute to establishment of a stable virtual spatial reference insusceptible to ground deformation, thus improving stability and reliability of a monitoring reference for deformation.

However, monitoring reference points (intelligent observation stations) for deformation are usually located in deformation areas, and updated with low efficiency and poor accuracy, thus hardly satisfying the demand for deformation monitoring automation in engineering.

SUMMARY OF THE INVENTION

In order to solve the shortcomings of the background, the present disclosure provides a method and system for establishing a space-ground integrated real-time monitoring reference for dam deformation. Reference point positions are dynamically updated in real time automatically with high precision through a multi-source data fusion processing policy.

The present disclosure employs a technical solution as follows: a method for establishing a space-ground integrated real-time monitoring reference for dam deformation includes:
  transmitting control instructions to a space-based Beidou system, a ground-based measurement robot system and a ground-based inverted plumb line system;
  obtaining a dynamic reference point position of a dam deformation area in real time through the space-based Beidou system;
  obtaining a spatial relative reference point position of the dam deformation area in real time through the ground-based measurement robot system;
  obtaining a static gravity reference point position of the dam deformation area in real time through the ground-based inverted plumb line system; and
  performing data fusion on the dynamic reference point position, the spatial relative reference point position, and the static gravity reference point position, and obtaining a monitoring reference value of the dam deformation area.

In the above technical solution, the performing data fusion on the dynamic reference point position, the spatial relative reference point position, and the static gravity reference point position, and obtaining a monitoring reference value of the dam deformation area includes:
  constructing corresponding error equations for the dynamic reference point position, the spatial relative reference point position, and the static gravity reference point position respectively;
  integrating the error equations corresponding to the dynamic reference point position, the spatial relative reference point position, and the static gravity reference point position to form an error equation of combined adjustment;
  setting a comprehensive weight matrix used for representing weights of the dynamic reference point position, the spatial relative reference point position, and the static gravity reference point position; and
  based on the error equation of the combined adjustment and the comprehensive weight matrix, taking a minimum sum of weighted error squares as an objective, and obtaining the monitoring reference value of the dam deformation area through a least square principle.

In the above technical solution, an error equation of the dynamic reference point position is expressed as follows:

$$V_{GNSS} = A_{GNSS} X - L_{GNSS}, \text{ where}$$

$V_{GNSS}$ represents a residual vector of global navigation satellite system (GNSS) observed values of the space-based Beidou system; $A_{GNSS}$ represents a design matrix of the GNSS observed values; X represents the monitoring reference value of the dam deformation area; and $L_{GNSS}$ represents a GNSS observed value vector.

An error equation of the spatial relative reference point position is expressed as follows:

$$V_{Robot} = A_{Robot} X - L_{Robot}, \text{ where}$$

$V_{Robot}$ represents a residual vector of observed values of the ground-based measurement robot system; $A_{Robot}$ represents a design matrix of the observed values of the ground-based measurement robot system; and $L_{Robot}$ represents an observed value vector of the ground-based measurement robot system.

An error equation of the static gravity reference point position is expressed as follows:

$$V_{PlumbLine} = A_{PlumbLine} X - L_{PlumbLine}, \text{ where}$$

$V_{PlumbLine}$ represents a residual vector of observed values of inverted plumb line displacement; $A_{PlumbLine}$ represents a design matrix of the observed values of the inverted plumb line displacement; and $L_{PlumbLine}$ represents an observed value vector of the inverted plumb line displacement.

In the above technical solution, the error equation of the combined adjustment is expressed as follows:

$$\begin{bmatrix} V_{GNSS} \\ V_{Robot} \\ V_{PlumbLine} \end{bmatrix} = \begin{bmatrix} A_{GNSS} \\ A_{Robot} \\ A_{PlumbLine} \end{bmatrix} X - \begin{bmatrix} L_{GNSS} \\ L_{Robot} \\ L_{PlumbLine} \end{bmatrix}$$

$V_{GNSS}$ represents a residual vector of global navigation satellite system (GNSS) observed values of the space-based Beidou system; $A_{GNSS}$ represents a design matrix of the GNSS observed values; X represents the monitoring reference value of the dam deformation area; $L_{GNSS}$ represents a GNSS observed value vector; $V_{Robot}$ represents a residual vector of observed values of the ground-based measurement robot system; $A_{Robot}$ represents a design matrix of the observed values of the ground-based measurement robot system; $L_{Robot}$ represents an observed value vector of the ground-based measurement robot system; $V_{PlumbLine}$ represents a residual vector of observed values of inverted plumb line displacement; $A_{PlumbLine}$ represents a design matrix of the observed values of the inverted plumb line displacement; and $L_{PlumbLine}$ represents an observed value vector of the inverted plumb line displacement.

In the above technical solution, the comprehensive weight matrix P is expressed as follows:

$$P = \begin{bmatrix} P_{GNSS} & 0 & 0 \\ 0 & P_{Robot} & 0 \\ 0 & 0 & P_{PlumbLine} \end{bmatrix},$$

where $P_{GNSS}$ represents a weight matrix of the GNSS observed values; $P_{Robot}$ represents a weight matrix of the observed values of a ground-based measurement robot system; and $P_{PumbLine}$ represents a weight matrix of the observed values of the inverted plumb line displacement.

The present disclosure further provides a system for establishing a space-ground integrated real-time monitoring reference for dam deformation. The system is used to implement the method for establishing a space-ground integrated real-time monitoring reference for dam deformation and includes a space-based Beidou system, a ground-based measurement robot system, a ground-based inverted plumb line system, an on-site intelligent observation station and a monitoring center.

The space-based Beidou system transmits a dynamic reference point position of a dam deformation area obtained in real time to the monitoring center through the on-site intelligent observation station.

The ground-based measurement robot system transmits a spatial relative reference point position of the dam deformation area obtained in real time to the monitoring center through the on-site intelligent observation station.

The ground-based inverted plumb line system transmits a static gravity reference point position of the dam deformation area obtained in real time to the monitoring center through the on-site intelligent observation station.

The monitoring center performs data fusion on the dynamic reference point position, the spatial relative reference point position and the static gravity reference point position to obtain a monitoring reference value of the dam deformation area, and transmits control instructions to the space-based Beidou system, the ground-based measurement robot system and the ground-based inverted plumb line system.

In the above technical solution, the system for establishing a space-ground integrated real-time monitoring reference for dam deformation further includes an integrated observation pillar. The integrated observation pillar is fixedly arranged in the dam deformation area. A Beidou navigation satellite system (BDS)/GNSS receiver of the space-based Beidou system is fixed at a top of the integrated observation pillar.

The ground-based measurement robot system includes an observation station point, reference points and monitoring points. The observation station point is established on a stable foundation according to a dam deformation area condition, a measurement robot automatic observation system is mounted on the established observation station point, and the measurement robot automatic observation system is arranged on one side of the integrated observation pillar.

The stable reference points are evenly established according to the dam deformation area condition, each reference point is equipped with a single-prism group exactly facing the observation station point, and directions and distances from the observation station point to all the reference points cover the entire dam deformation area.

The monitoring points are evenly arranged on the dam deformation area according to a section, and one or more single-prism groups or 360° prism groups exactly facing the observation station point is or are mounted on each monitoring point.

The ground-based inverted plumb line system is arranged on the other side of the integrated observation pillar, and an inverted plumb line of the ground-based inverted plumb line system is deeply buried in foundation bedrock in the dam deformation area through a vertical borehole.

In the above technical solution, the system for establishing a space-ground integrated real-time monitoring reference for dam deformation further includes a protective room. The integrated observation pillar is arranged in the protective room, and the top of the integrated observation pillar extends out of the protective room upwards. The measurement robot automatic observation system and the ground-based inverted plumb line system are located in the protective room. The on-site intelligent observation station is arranged in the protective room.

In the above technical solution, the space-based Beidou system, the ground-based measurement robot system and the ground-based inverted plumb line system communicate with corresponding data access modules through corresponding protocol conversion modules respectively. The data access modules communicate with the on-site intelligent observation stations. The data access modules use a transmission control protocol (TCP)/Internet protocol (IP). The on-site intelligent observation stations and the data access modules are networked in an optical fiber Ethernet mode.

In the technical solution, all apparatuses in the monitoring center are connected to a permanent power supply in a plant room, and an uninterruptible power supply (UPS) is used as an emergency power supply for supplying power. The on-site intelligent observation stations, the space-based Beidou system, the ground-based measurement robot system and the ground-based inverted plumb line system are connected to the permanent power supply nearby, and corresponding distribution boxes and cabinets are grounded and connected to a grounding grid of a power station nearby.

Copper strips are welded to steel pipes at different positions of the on-site intelligent observation stations, the space-based Beidou system, the ground-based measurement robot system and the ground-based inverted plumb line system, and used as grounding points; and copper strip extension lines are used for towing other apparatuses without grounding points of the on-site intelligent observation stations, the space-based Beidou system, the ground-based measurement robot system and the ground-based inverted plumb line system, and used as grounding points.

The present disclosure has the beneficial effects: Based on fusion data processing of a space-based Beidou (real-time dynamic reference), a ground-based measurement robot (spatial relative reference) and a ground-based inverted plumb line instrument apparatus (static gravity reference), the reference point positions are dynamically updated in real time automatically with high precision through a multi-source data fusion processing policy. The method for establishing a space-ground integrated monitoring real-time reference for dam deformation is formed. Multi-angle, multi-level and omnibearing monitoring is implemented on dam deformation, such that high standard requirements of modern dam safety management for deformation monitoring automation, real-time and accuracy are satisfied.

In the figures: 11—space-based Beidou of space-based Beidou system, 12—BDS/GNSS receiver of space—based Beidou system, 21—measurement robot automatic observation system, 22—reference point, 23—monitoring point, 3—ground—based inverted plumb line system, 4—integrated observation pillar, and 5—protective room.

DETAILED DESCRIPTION OF THE INVENTION

The present disclosure will be further described in detail below with reference to the accompanying drawings and specific examples, which are not intended to limit the present disclosure, so as to facilitate clear understanding of the present disclosure.

Figure 1:
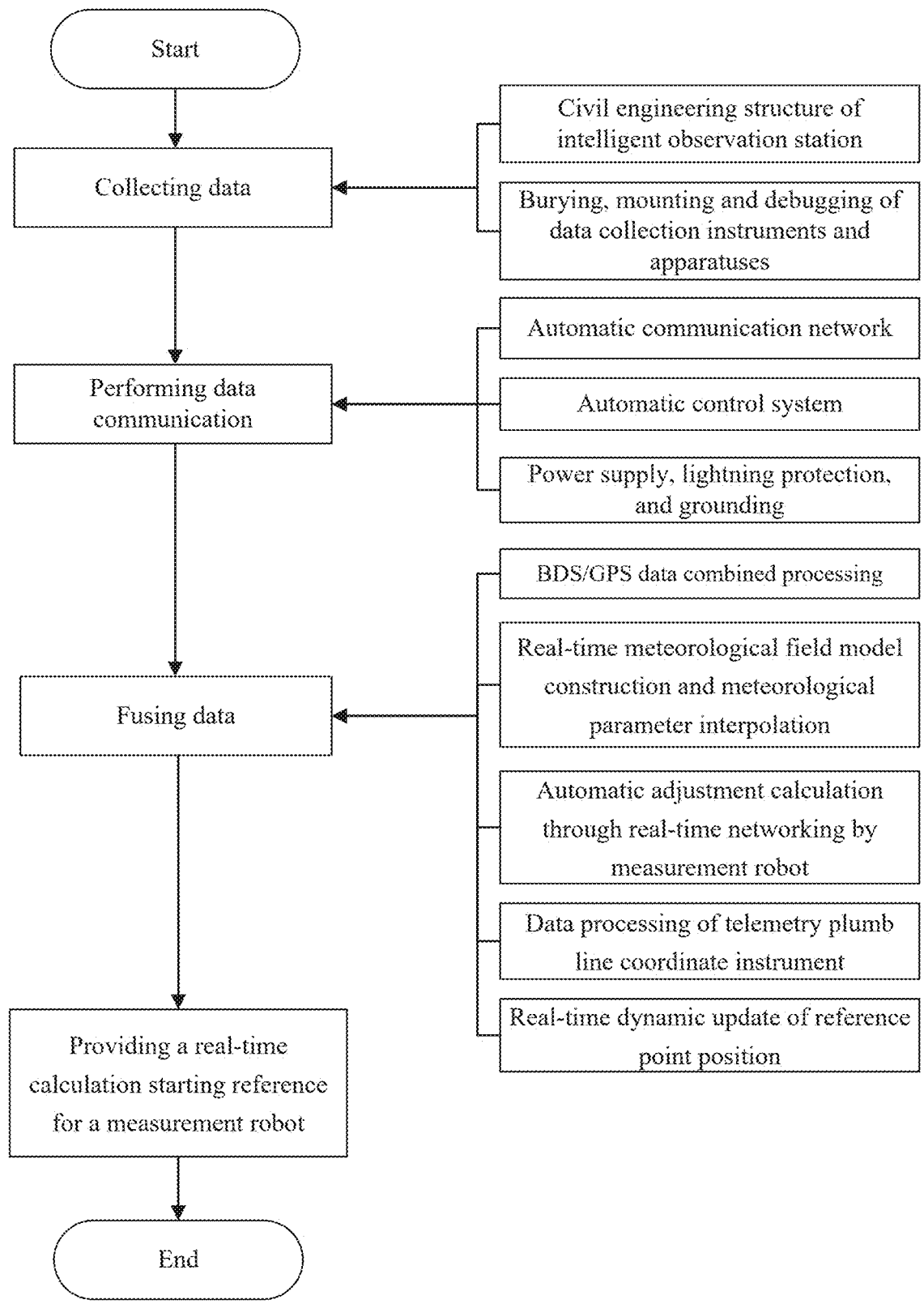
FIG. 1 is a schematic diagram of the method according to the present disclosure.

As shown in FIG. 1. a method for establishing a space-ground integrated real-time monitoring reference for dam deformation in the present disclosure includes:

control instructions are transmitted to a space-based Beidou system, a ground-based measurement robot system and a ground-based inverted plumb line system 3;

a dynamic reference point position of a dam deformation area is obtained in real time through the space-based Beidou system;

a spatial relative reference point position of the dam deformation area is obtained in real time through the ground-based measurement robot system;

a static gravity reference point position of the dam deformation area is obtained in real time through the ground-based inverted plumb line system 3; and data fusion is performed on the dynamic reference point position, the spatial relative reference point position, and the static gravity reference point position, and a monitoring reference value of the dam deformation area is obtained.

Specifically, the method further includes: the monitoring reference value of the dam deformation area is fed back to the ground-based measurement robot system for a subsequent real-time calculation starting reference.

The present disclosure further provides a system for establishing a space-ground integrated real-time monitoring reference for dam deformation. The system is used to implement the method for establishing a space-ground integrated real-time monitoring reference for dam deformation and includes a space-based Beidou system, a ground-based measurement robot system, a ground-based inverted plumb line system 3, an on-site intelligent observation station and a monitoring center.

The space-based Beidou system transmits a dynamic reference point position of a dam deformation area obtained in real time to the monitoring center through the on-site intelligent observation station.

The ground-based measurement robot system transmits a spatial relative reference point position of the dam deformation area obtained in real time to the monitoring center through the on-site intelligent observation station.

The ground-based inverted plumb line system 3 transmits a static gravity reference point position of the dam deformation area obtained in real time to the monitoring center through the on-site intelligent observation station.

The monitoring center performs data fusion on the dynamic reference point position, the spatial relative reference point position and the static gravity reference point position to obtain a monitoring reference value of the dam deformation area, and transmits control instructions to the space-based Beidou system, the ground-based measurement robot system and the ground-based inverted plumb line system 3.

Figure 2:
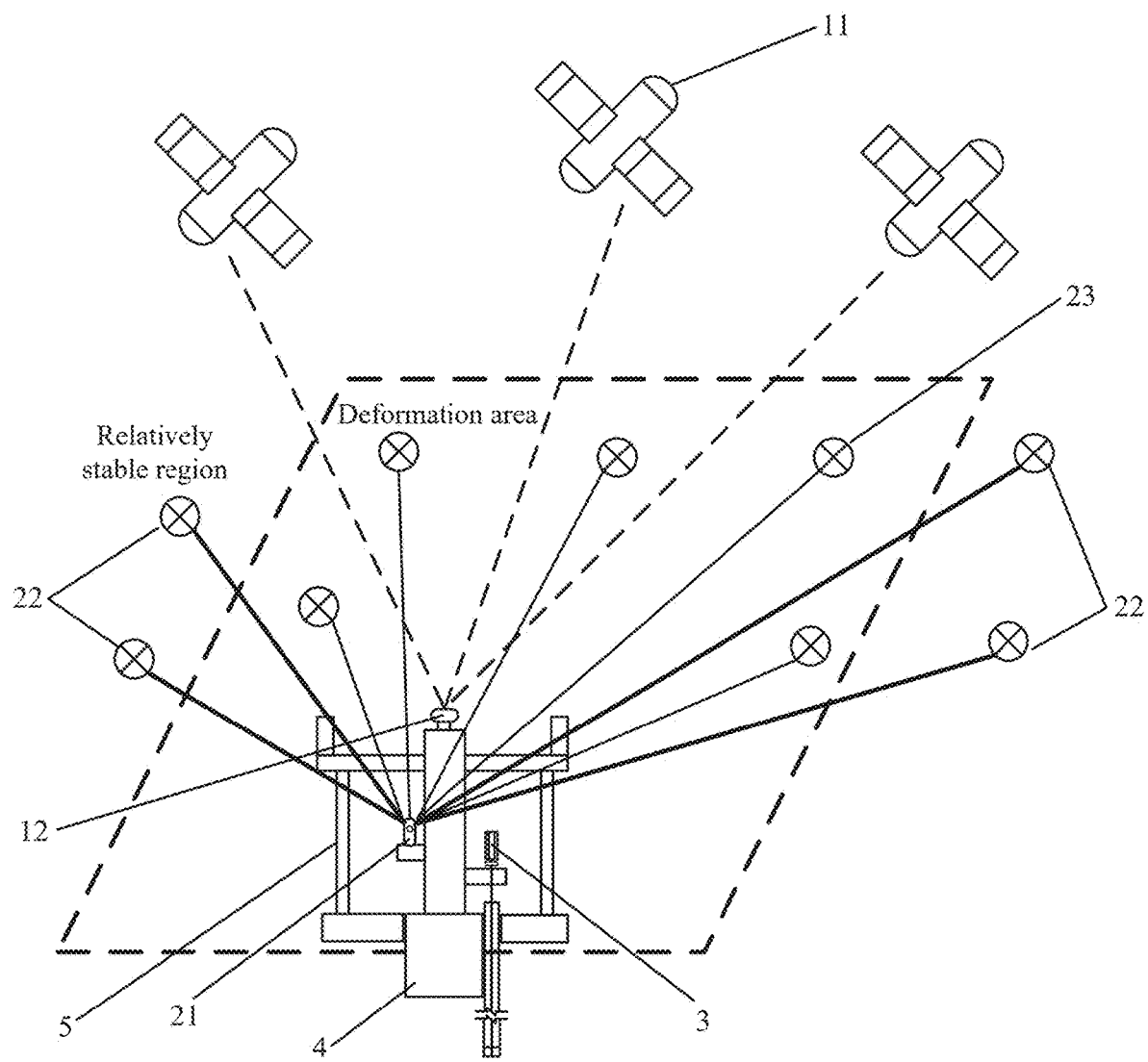
FIG. 2 is a schematic structural diagram of a system according to the present disclosure.

As shown in FIG. 2, the present disclosure further includes an integrated observation pillar 4. The integrated observation pillar 4 is fixedly arranged in the dam deformation area. A Beidou navigation satellite system (BDS)/global navigation satellite system (GNSS) receiver 12 of the space-based Beidou system is fixed at a top of the integrated observation pillar 4. The space-based Beidou 11 of the space-based Beidou system is arranged above the dam deformation area.

The ground-based measurement robot system includes an observation station point, reference points 22 and monitoring points 23. The observation station point is established on a stable foundation according to a dam deformation area condition. A measurement robot automatic observation system 21 is mounted on the established observation station point. The measurement robot automatic observation system 21 is arranged on one side of the integrated observation pillar 4.

The stable reference points are evenly established according to the dam deformation area condition. Each reference point is equipped with a single-prism group exactly facing the observation station point. Directions and distances from the observation station point to all the reference points cover the entire dam deformation area.

The monitoring points 23 are evenly arranged on the dam deformation area according to a section. One or more single-prism groups or 360° prism groups exactly facing the observation station point is or are mounted on each monitoring point 23.

The ground-based inverted plumb line system 3 is arranged on the other side of the integrated observation pillar 4. An inverted plumb line of the ground-based inverted plumb line system 3 is deeply buried in foundation bedrock in the dam deformation area through a vertical borehole.

Specifically, the system for establishing a space-ground integrated real-time monitoring reference for dam deformation further includes a protective room 5. The integrated observation pillar 4 is arranged in the protective room 5, and the top of the integrated observation pillar extends out of the protective room 5 upwards. The measurement robot automatic observation system 21 and the ground-based inverted plumb line system 3 are located in the protective room 5. The on-site intelligent observation station is arranged in the protective room 5.

A plurality of integrated observation pillars 4 are provided. The integrated observation pillars are distributed on a stable foundation according to an observed area condition, so as to establish a plurality of observation station points (greater than or equal to 2) to form an intersection network. A measurement robot automatic observation system 21 is mounted on each observation station point. Each integrated observation pillar 4 is provided with a BDS/GNSS receiver 12 of the space-based Beidou system and a ground-based inverted plumb line system 3. Each integrated observation pillar 4 is used as a monitoring reference point for measuring the dynamic reference point position, the spatial relative reference point position and the static gravity reference point position of a position where each integrated observation pillar 4 is located.

Principles of the present disclosure are further explained below in conjunction with specific examples.

Figure 3:
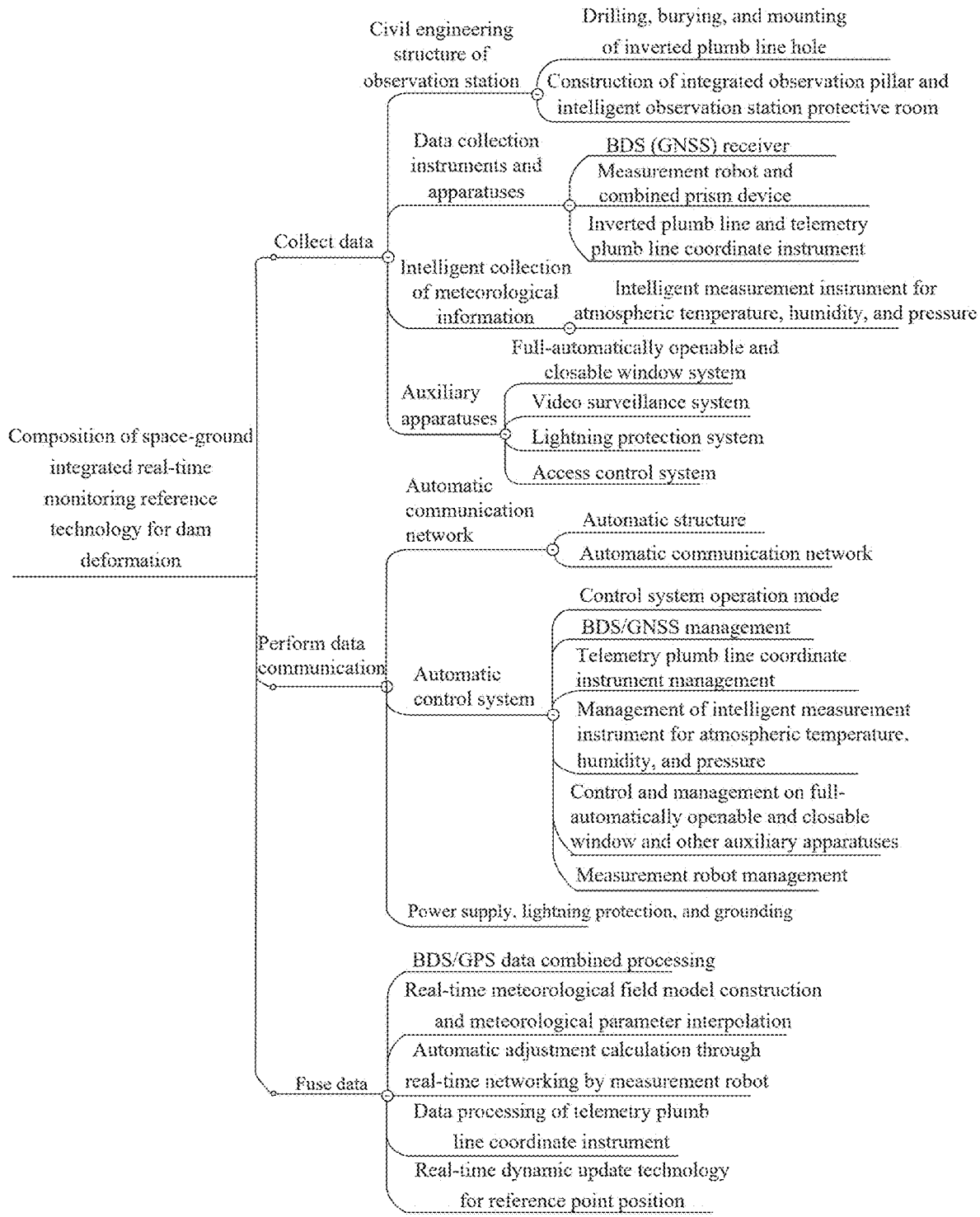
FIG. 3 is a diagram of a technical principle according to the present disclosure.

As shown in FIG. 3, the method and system for establishing a space-ground integrated real-time monitoring reference for dam deformation provided in the present disclosure mainly include three major links: data collection, data management, and data fusion.

In order to continuously and effectively carry out data collection subsequently, it is necessary to complete construction of relevant civil engineering structures of the observation station and layout of a data collection apparatus and a radiation apparatus before the method and the system are operated.

The civil engineering structures mainly include: drilling, burying, and mounting of inverted plumb line holes, construction of an integrated observation pillar 4 and an intelligent observation station protective room 5, and the like.

The inverted plumb line is a stainless steel wire buried deeply on foundation bedrock (a foundation stability reference) through vertical drilling. The stainless steel wire keeps in a vertical state all the time by making use of buoyancy of an inverted plumb line floating body group. A change of the integrated observation pillar 4 of the intelligent observation station relative to the stainless steel wire is regularly observed to obtain horizontal displacement of the integrated observation pillar 4 of the intelligent observation station relative to an anchor point of the stainless steel wire. The inverted plumb line consists of a floating body group, a plumb line, an observation pillar, an anchor block and other instruments and apparatuses.

The integrated observation pillar 4 is a main structure for the BDS/GNSS receiver, the measurement robot automatic observation system, the ground-based inverted plumb line and other instruments and apparatuses to be mounted. Its foundation needs to keep relatively stable and should be constructed independently from a foundation of protective room 5. A construction structure of the integrated observation pillar 4 and the protective room 5 is shown in FIG. 2.

The protective room 5 mainly includes construction of a 2.5 m (length)×2.5 m (width)×4 m (height) protective room 5 (one or two floors according to site conditions).

The burying, mounting and debugging of data collection instruments and apparatuses mainly include: the BDS/GNSS receiver 12, a measurement robot and combined prism device, the inverted plumb line and a telemetry plumb line coordinate instrument, a meteorological information collection apparatus, an auxiliary apparatus, etc.

The BDS/GNSS receiver 12 is a domestic Huace or imported Leica GNSS receiver apparatus.

The ground-based measurement robot system and combined prism device is an imported Leica TM and TS series measurement robot with nominal accuracy of angle measurement±0.5" and distance measurement±(0.6+1 PPM), and a domestic Suzhou Yiguang RTS series measurement robot with nominal accuracy of angle measurement±0.5" or ±1" and distance measurement±(1+1 PPM).

The inverted plumb line in the ground-based inverted plumb line system 3 and the telemetry plumb line coordinate instrument are a domestic inverted plumb line apparatus and a domestic telemetry plumb line coordinate instrument.

The meteorological information collection apparatus is use for real-time meteorological correction of observation elements of the ground-based measurement robot system. A meteorological field model of a deformation monitoring area needs to be constructed, and atmospheric temperature, humidity and air pressure information collection sensors need to be set at the observation station point, the monitoring points 23 and the reference points.

Auxiliary apparatus: in order to guarantee intelligent operation of data collection instruments and apparatuses at the observation station point, the protective room 5 needs to be equipped with a full-automatically openable and closable window, a video surveillance system, a lightning protection system and an access control system.

In order to continuously and effectively transmit collected data to the monitoring center subsequently, effective communication between the space-based Beidou system, the ground-based measurement robot system, the ground-based inverted plumb line system 3, the on-site intelligent observation station and the monitoring center, and automatic control configuration must be achieved before the method and the system run.

According to characteristics of multiple and scattered of the automatic monitoring reference points for deformation, a surveillance system structure of the present disclosure may be set to be a two-level structure of a monitoring center and an on-site intelligent observation station.

A server, a workstation, a switch and other apparatuses are deployed in the monitoring center. A permanent power supply and an uninterruptible power supply (UPS) are used for dual-channel power supply to guarantee reliability of system power supply. All data of the on-site intelligent observation station are collected into a center station through optical fiber.

The on-site intelligent observation station is mainly formed by networking communication networks of the BDS/GNSS receiver, the measurement robot, the telemetry plumb line coordinate instrument, the intelligent measurement instrument for atmospheric temperature, humidity, and pressure and other instruments and apparatuses.

In order to achieve parallel, real-time, fast communication and control, the on-site intelligent observation station uses the TCP/IP protocol to develop a data access module, which carries out overall communication and data integration on the BDS/GNSS receiver, the measurement robot, the telemetry plumb line coordinate instrument, the intelligent measurement instrument for atmospheric temperature, humidity, and pressure, etc. At an apparatus end, the on-site intelligent observation station interfaces with different apparatuses through the protocol conversion modules.

In order to implement autonomous control over the ground-based measurement robot system, the monitoring center uses GeoCOM interface technology to develop a measurement robot control module. Various commands and actions are integrated, which includes communication connection, prism search, rotation, facing left and right, precise alignment, distance measurement, angle measurement, instrument state monitoring and other functions. The measurement robot can be controlled to observe strictly according to specification requirements.

Figure 4:
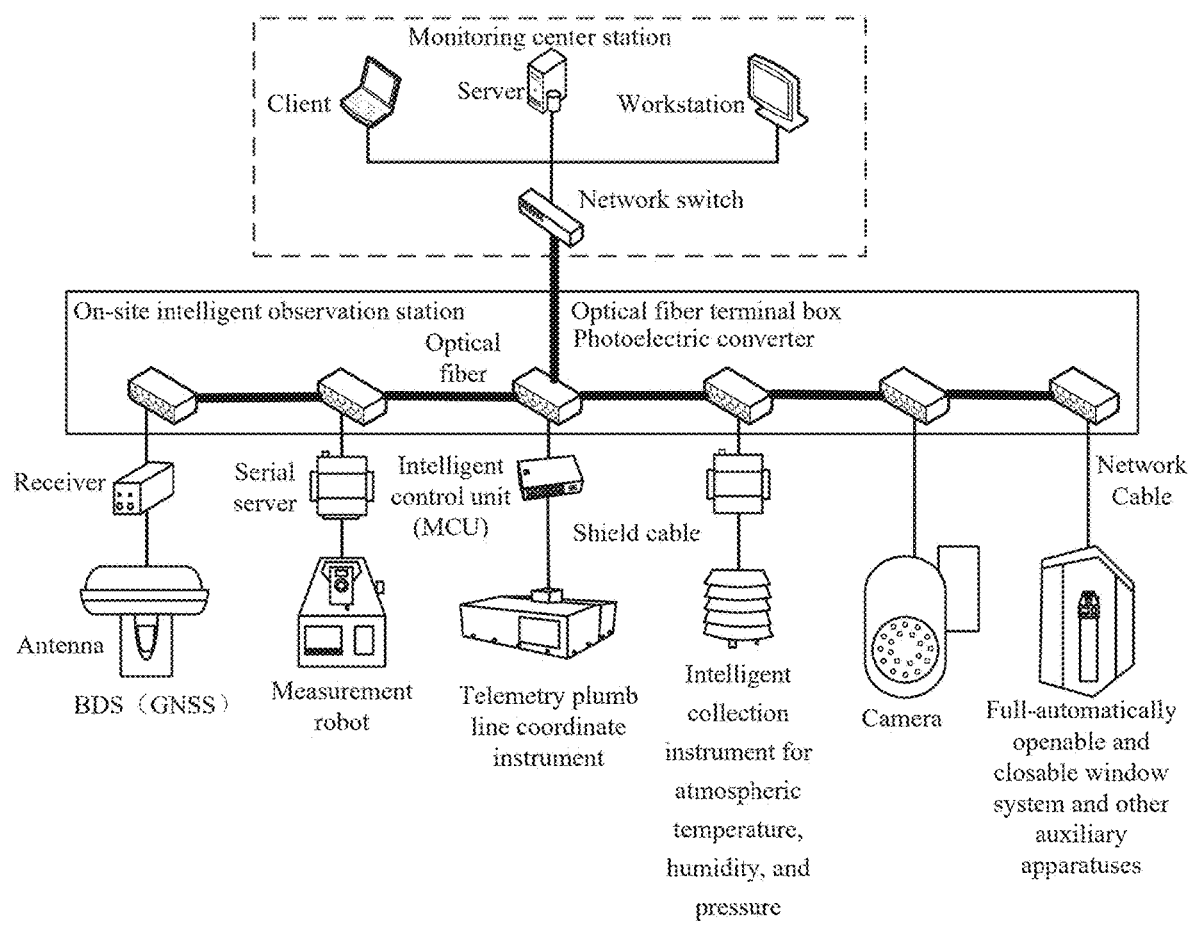
FIG. 4 is a schematic diagram of communication networking according to the present disclosure.

An automation communication network is networked in an optical fiber Ethernet mode, as shown in FIG. 4. The monitoring center is located in an engineering plant room. The on-site intelligent observation station is connected to the monitoring center station by optical fiber. Information of atmospheric temperature, humidity and pressure of the combined prism station (monitored object) of the ground-based measurement robot system is connected to a nearby observation station point through network cables and optical fiber.

An automatic control system of the monitoring center of the present disclosure operates in the following types:

Response type: the monitoring center station transmits a command, the space-based Beidou system, the ground-based measurement robot system and the ground-based inverted plumb line system 3 receive the command from a control unit, complete specified measurement, temporarily store data after the measurement, and transmit measurement data to the monitoring center according to command requirements.

Self-report type: each control unit of the space-based Beidou system, the ground-based measurement robot system and the ground-based inverted plumb line system 3 automatically collects data according to time and mode preset by the monitoring center station, temporarily stores measurement data, and transmits the data to the monitoring center at the same time.

The space-based Beidou system includes a BDS/GNSS management system, which mainly includes a data collection module, a data solution module, a data management module, a state monitoring module, etc. A space-based real-time dynamic reference is provided for establishment of an automatic space-ground integrated monitoring reference for deformation.

The data collection module supports station point data access, RINEX file storage and other functions. Automatic access is implemented in real time by configuring station point communication parameters and observation parameters (an altitude angle, a sampling rate, etc.).

The data solution module includes data preprocessing, real-time dynamic solution, static single-baseline solution, static multi-baseline solution, coordinate conversion, etc., and supports free combination solution of a plurality of systems such as BDS/GPS/GLONASS.

The data management module can be used for viewing all original observation data and solved results, and output charts.

The state monitoring module can be used for viewing working states, star charts, communication states, data storage states, etc. of all station points.

The ground-based inverted plumb line system 3 includes a telemetry plumb line coordinate instrument, which is controlled and data collected through an intelligent measuring and controlling unit. This system can first complete the measurement of plumb line coordinates and data acquisition before the ground-based measurement robot system starts running, so as to provide an accurate ground-based static gravity reference for establishment of the automatic "space-ground-based, time-space, and static and dynamic state" monitoring for deformation.

In order to guarantee intelligent operation of data collection instruments and apparatuses at the intelligent observation station, the protective room 5 needs to be equipped with a full-automatically openable and closable window system, a video surveillance system, a lightning protection system and an access control system. For this reason, remote control software of full-automatically openable and closable window and other apparatuses is used to achieve coordinated operation with observation of the measurement robot.

The ground-based measurement robot system includes an automatic observation module, an adjustment calculation module, a data management module, a state monitoring module, etc.

The automatic monitoring module is a personal computer (PC)-based remote measurement robot collection control software and preprocessing software for remotely controlling data collection and intelligent recognition of line of sight occlusion for the measurement robot. The automatic observation module of the measurement robot may control the measurement robot to carry out prism search and alignment, automatic observation, overrun or abnormal re-measurement, etc. Observation solutions may be freely set. Various observation modes such as single observation station polar coordinate, multi-observation-station polar coordinate, forward intersection, corner net, etc. are supported. The module supports real-time collection, can freely set observation accuracy and tolerance, and allow manual supplementary data measurement.

The state monitoring module may view states of the measurement robot, weather stations, the openable and closable windows, the video surveillance apparatus and other apparatuses in real time, remotely control the above apparatuses, and support real-time monitoring screen display and camera tripod head control functions.

Figure 5:
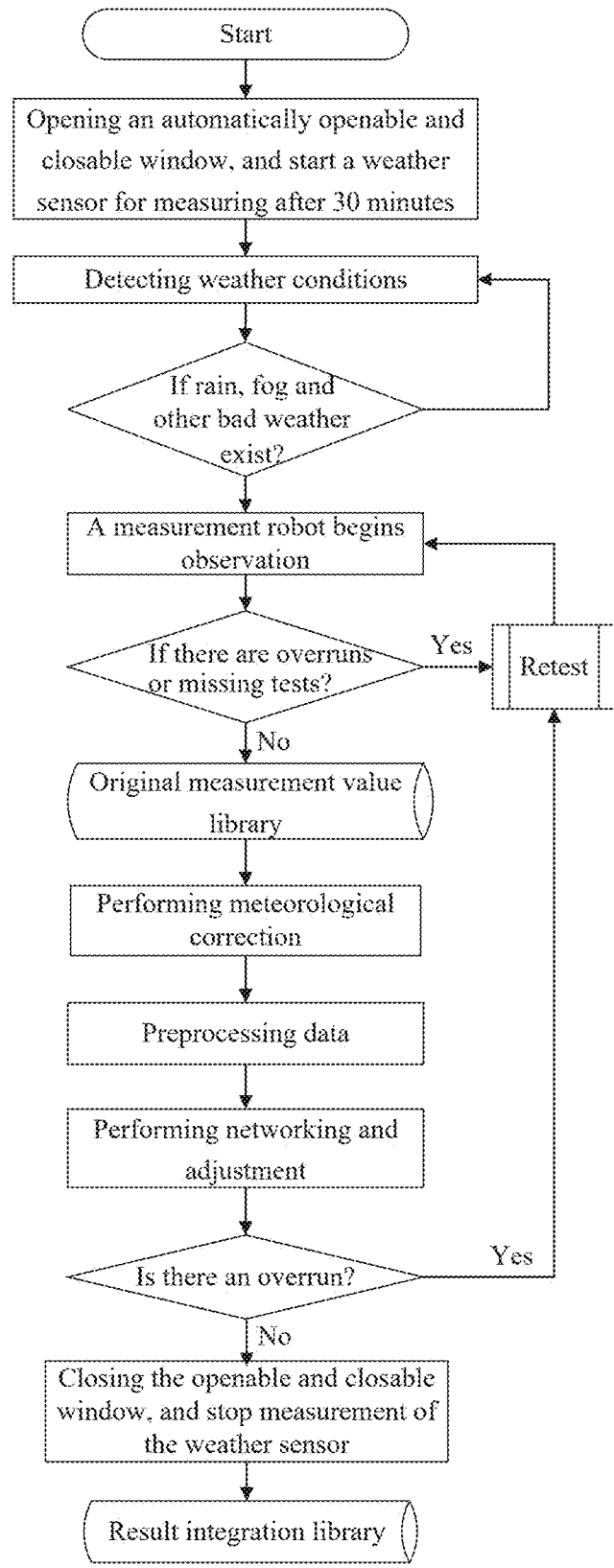
FIG. 5 is a flowchart of observation of a measurement robot according to the present disclosure.

An observation flow of the measurement robot of the intelligent observation station is shown in FIG. 5.

All apparatuses in the monitoring center are connected to the permanent power supply in the plant room, and the uninterruptible power supply (UPS) is used as an emergency power supply for supplying power. The space-based Beidou system, the ground-based measurement robot system (observation station point and (combined) prism station point) and the ground-based inverted plumb line system 3 are connected to the permanent power supply nearby.

In order to prevent lightning damage to the space-based Beidou system, the ground-based measurement robot system (observation station point and (combined) prism station point) and the ground-based inverted plumb line system 3 and improve the reliability of system operation, all distribution boxes and cabinets are grounded and connected to grounding grids of power stations nearby.

In order to reliably transmit monitoring data and reduce signal interference, copper strips are welded to steel pipes at different positions of the space-based Beidou system, the ground-based measurement robot system (the observation station point and the (combined) prism station point) and the ground-based inverted plumb line system 3 as grounding points respectively. Copper strip extension lines are used for towing other apparatuses without grounding points, and used as grounding points.

After arrangement of the space-based Beidou system, the ground-based measurement robot system, the ground-based inverted plumb line system 3, the on-site intelligent observation station, and the monitoring center and configuration of corresponding networking communication and control methods are completed, the method for establishing a space-ground integrated real-time monitoring reference for dam deformation is performed.

The space-based Beidou system, the ground-based measurement robot system, and the ground-based inverted plumb line system 3 corresponding to each integrated observation pillar 4 collect position data of the monitoring reference point in real time according to the control instruction transmitted by the monitoring center (that is, correspondingly collect the dynamic reference point position, the spatial relative reference point position, and the static gravity reference point position of the integrated observation pillar 4 where the monitoring reference point is located), and upload the position data to the monitoring center for data fusion after local preprocessing.

The space-based Beidou system performs combined processing on BDS/GPS data. For problems of low efficiency, weak universality and easy failure in high dimensional ambiguity fixation of BDS/GNSS multi-system data fusion processing in common ambiguity fixation algorithms of DecisionFunction, Bootstrap and LAMBDA, an improved LAMBDA method is proposed. By combining with existing methods, a complete high dimensional ambiguity fixation strategy suitable for BDS/GNSS data fusion processing is provided, which solves a series of problems in high dimensional ambiguity fixation of existing ambiguity fixation methods. The strategy has characteristics of simple model, easy implementation, strong scalability, high efficiency and desirable accuracy.

Firstly, according to a float solution estimated value and a variance-covariance matrix of an ambiguity obtained in a BDS/GNSS data fusion process, an ambiguity fixing algorithm is selected. In a case that a fractional part and a standard deviation of each ambiguity estimated value are less than a threshold of a decision function method, the decision function method is used, and otherwise, the improved LAMBDA method is used. When the improved LAMBDA method is used, the float solution estimated value and the variance-covariance matrix of the ambiguity are classified according to the system. Then a single-system ambiguity is fixed according to the classified float solution estimated value and the variance-covariance matrix of the ambiguity separately through the LAMBDA algorithm. Finally a fixed solution of an ambiguity of a parameter to be estimated is calculated by plugging a fixed result of the ambiguity into an original observation equation.

When the LAMBDA algorithm is used for fixing the single-system ambiguity, in a case that a fixed result of a system does not pass a Ratio value test, an ambiguity parameter corresponding to a least observed value in the system is deleted, and the LAMBDA algorithm is performed again until the fixed result of the ambiguity of the system passes the Ratio value test or a number of remaining ambiguity parameters is less than a threshold. The deleted ambiguity parameter maintains a float state.

After the float solution and the variance-covariance matrix of the ambiguity are classified according to the system, a least squares problem model of an integer with a fixed ambiguity can be established by matrix operation. Then the ambiguities of the two systems are integer fixed according to the LAMBDA method.

Based on a measurement robot ranging edge meteorological correction algorithm of a real-time meteorological field model, the ground-based measurement robot system establishes meteorological field model of temperature, humidity and pressure in a deformation monitoring area by using meteorological factors of the intelligent observation station point and (combined) prism station point obtained by the intelligent measurement instrument for atmospheric temperature, humidity, and pressure. All meteorological parameters between the observation station point and the (combined) prism station point can be obtained by interpolation through the model. The model can be used for fine correction of meteorological factors of observed values at ranging edge between the observation station point and the (combined) prism station point. An algorithm for automatic adjustment through real-time networking by a measurement robot mainly includes data preprocessing, adjustment calculation, accuracy evaluation and other functions. The invention patent "method for automatic adjustment calculation through real-time networking by measurement robot (ZL202111163239.7)" that the technology is applied for has been authorized.

After the ground-based inverted plumb line system 3 is equipped with a telemetry plumb line coordinate instrument through an inverted plumb line method, a change of the integrated observation pillar 4 of the intelligent observation station relative to the stainless steel wire can be monitored in real time. Since an anchor point of the stainless steel wire is in deep bedrock, the stainless steel wire is always kept in a vertical state by using the buoyancy of the inverted plumb line floating body group, such that horizontal displacement of the integrated observation pillar 4 relative to an inverted plumb line bedrock anchor block can be actually obtained. A calculation formula is as follows:

$$Dx=Kx(X0-Xi)$$

$$Dy=Ky(Y0-Yi)$$

In the formula:
X0, Y0 are first observed values of the inverted plumb line; Xi, Yi are current observed values of the inverted plumb line;
Dx, Dy are displacement of the inverted plumb line measurement point; and Kx, Ky are direction coefficients, and usually are ±1.

The monitoring center performs data fusion on the dynamic reference point position, the spatial relative reference point position, and the static gravity reference point position, and obtains the monitoring reference value of the dam deformation area. Specifically, the process includes:
corresponding error equations are constructed for the dynamic reference point position, the spatial relative reference point position, and the static gravity reference point position respectively;
the error equations corresponding to the dynamic reference point position, the spatial relative reference point position, and the static gravity reference point position are integrated to form an error equation of combined adjustment;
a comprehensive weight matrix used for representing weights of the dynamic reference point position, the spatial relative reference point position, and the static gravity reference point position is set; and
based on the error equation of the combined adjustment and the comprehensive weight matrix, a minimum sum of weighted error squares is taken as an objective, and the monitoring reference value of the dam deformation area is obtained through a least square principle.

Specifically, an error equation of the dynamic reference point position is expressed as follows:

$$V_{GNSS}=A_{GNSS}X-L_{GNSS}, \text{ where}$$

$V_{GNSS}$ represents a residual vector of GNSS observed values of the space-based Beidou system; $A_{GNSS}$ represents a design matrix of the GNSS observed values; X represents the monitoring reference value of the dam deformation area; and $L_{GNSS}$ represents a GNSS observed value vector.

An error equation of the spatial relative reference point position is expressed as follows:

$$V_{Robot} = A_{Robot} X - L_{Robot}, \text{ where}$$

$V_{Robot}$ represents a residual vector of observed values of the ground-based measurement robot system; $A_{Robot}$ represents a design matrix of the observed values of the ground-based measurement robot system; and $L_{Robot}$ represents an observed value vector of the ground-based measurement robot system.

An error equation of the static gravity reference point position is expressed as follows:

$$V_{PlumbLine} = A_{PlumbLine} X - L_{PlumbLine}, \text{ where}$$

$V_{PlumbLine}$ represents a residual vector of observed values of inverted plumb line displacement; $A_{PlumbLine}$ represents a design matrix of the observed values of the inverted plumb line displacement; and $L_{PlumbLine}$ represents an observed value vector of the inverted plumb line displacement.

The observed value vectors correspond to dynamic reference point position data, spatial relative reference point position data, and static gravity reference point position data respectively. Each observed value has its own specific source of error and characteristics.

Specifically, the error equation of the combined adjustment is expressed as follows:

$$V = AX - L.$$

That is, $$\begin{bmatrix} V_{GNSS} \\ V_{Robot} \\ V_{PlumbLine} \end{bmatrix} = \begin{bmatrix} A_{GNSS} \\ A_{Robot} \\ A_{PlumbLine} \end{bmatrix} X - \begin{bmatrix} L_{GNSS} \\ L_{Robot} \\ L_{PlumbLine} \end{bmatrix}$$

$V_{GNSS}$ represents a residual vector of global navigation satellite system (GNSS) observed values of the space-based Beidou system; $A_{GNSS}$ represents a design matrix of the GNSS observed values; X represents the monitoring reference value of the dam deformation area; $L_{GNSS}$ represents a GNSS observed value vector; $V_{Robot}$ represents a residual vector of observed values of the ground-based measurement robot system; $A_{Robot}$ represents a design matrix of the observed values of the ground-based measurement robot system; $L_{Robot}$ represents an observed value vector of the ground-based measurement robot system; $V_{PlumbLine}$ represents a residual vector of observed values of inverted plumb line displacement; $A_{PlumbLine}$ represents a design matrix of the observed values of the inverted plumb line displacement; and $L_{PlumbLine}$ represents an observed value vector of the inverted plumb line displacement.

In an adjustment process, weights of the observed values need to be considered, such that the corresponding weight matrices are set. The comprehensive weight matrix P is expressed as follows:

$$P = \begin{bmatrix} P_{GNSS} & 0 & 0 \\ 0 & P_{Robot} & 0 \\ 0 & 0 & P_{PlumbLine} \end{bmatrix}, \text{ where}$$

$P_{GNSS}$ represents a weight matrix of the GNSS observed values; $P_{Robot}$ represents a weight matrix of the observed values of a ground-based measurement robot system; and $P_{PlumbLine}$ represents a weight matrix of the observed values of the inverted plumb line displacement.

In order to minimize the sum of the weighted error squares, X is solved through the least squares principle by the following equation:

$$X = (A^T P A)^{-1} A^T P L$$

The monitoring center obtains the real-time monitoring reference value X of each reference point in the dam deformation area and the corresponding residual vector V.

According to the adjustment result X, a displacement increment $\Delta X$ of each monitoring point (or observation pillar) relative to a historical reference is calculated. $\Delta X$ is compared with a preset safety threshold. An alarm module is triggered in a case that any $\Delta X$ is beyond the threshold, and send an overrun alarm to a monitoring center interface and a mobile terminal of operation and maintenance personnel.

According to a latest X value, the monitoring center updates a "calculation starting reference coordinate" of each observation pillar in a database. The updated reference coordinates are sent to the ground-based measurement robot system and the ground-based inverted plumb line system through a GeoCOM interface or the on-site intelligent observation station. A calculation starting reference of next observation of the ground-based measurement robot system and the ground-based inverted plumb line system is reset.

After receiving the new calculation starting reference, the ground-based measurement robot system automatically resets an observation station solution to guarantee that distance measurement and angle measurement are based on the latest reference. The inverted plumb line system updates initial coordinates of the anchor block synchronously to guarantee consistency of the reference of static observation.

The monitoring center regularly (for example, daily, weekly) summarizes a trend in changes of $\Delta X$, generates a deformation graph and a report, exports the report through a monitoring center data management module, and pushes the report to project management and decision-making levels in a PDF or spreadsheet form.

According to a trend analysis result, in a case that long-term drift or mutation is found, precision of each subsystem should be re-evaluated, and the weight matrix P should be adjusted.

The combined adjustment is started again to form a new combined adjustment result X'. The above updating and early warning process is repeated. Thus a fully automatic and closed-loop real-time monitoring and reference maintenance system is formed.

The above process can transform mathematical results of combined adjustment calculation into the calculation starting reference, early warning decision and operation and maintenance guidance for the observation system in time, such that a full-process closed loop of space-ground integrated monitoring for deformation with "accurate calculation, fast deduction and practical use" is achieved.

Contents not described in detail in the specification belong to the prior art known to those skilled in the art.

What is claimed is:

1. A method for establishing a space-ground integrated real-time monitoring reference for dam deformation, comprising:
transmitting control instructions to a space-based Beidou system, a ground-based measurement robot system and a ground-based inverted plumb line system;
obtaining a dynamic reference point position of a dam deformation area in real time through the space-based Beidou system;
obtaining a spatial relative reference point position of the dam deformation area in real time through the ground-based measurement robot system;
obtaining a static gravity reference point position of the dam deformation area in real time through the ground-based inverted plumb line system; and
performing data fusion on the dynamic reference point position, the spatial relative reference point position, and the static gravity reference point position, and obtaining a monitoring reference value of the dam deformation area, wherein
the performing data fusion on the dynamic reference point position, the spatial relative reference point position, and the static gravity reference point position, and obtaining a monitoring reference value of the dam deformation area comprise:
constructing corresponding error equations for the dynamic reference point position, the spatial relative reference point position, and the static gravity reference point position respectively;
integrating the error equations corresponding to the dynamic reference point position, the spatial relative reference point position, and the static gravity reference point position to form an error equation of combined adjustment;
setting a comprehensive weight matrix used for representing weights of the dynamic reference point position, the spatial relative reference point position, and the static gravity reference point position; and
based on the error equation of the combined adjustment and the comprehensive weight matrix, taking a minimum sum of weighted error squares as an objective, and obtaining the monitoring reference value of the dam deformation area through a least square principle, wherein
an error equation of the dynamic reference point position is expressed as follows:

$V_{GNSS} = A_{GNSS} X - L_{GNSS}$, wherein $V_{GNSS}$ represents a residual vector of GNSS observed values of the space-based Beidou system; $A_{GNSS}$ represents a design matrix of the GNSS observed values; X represents the monitoring reference value of the dam deformation area; and $L_{GNSS}$ represents a GNSS observed value vector;
an error equation of the spatial relative reference point position is expressed as follows:

$V_{Robot} = A_{Robot} X - L_{Robot}$, wherein $V_{Robot}$ represents a residual vector of observed values of the ground-based measurement robot system; $A_{Robot}$ represents a design matrix of the observed values of the ground-based measurement robot system; and $L_{Robot}$ represents an observed value vector of the ground-based measurement robot system;
an error equation of the static gravity reference point position is expressed as follows:

$V_{PlumbLine} = A_{PlumbLine} X - L_{PlumbLine}$, wherein $V_{PlumbLine}$ represents a residual vector of observed values of inverted plumb line displacement; $A_{PlumbLine}$ represents a design matrix of the observed values of the inverted plumb line displacement; and $L_{PlumbLine}$ represents an observed value vector of the inverted plumb line displacement;
the error equation of the combined adjustment is expressed as follows:

$$\begin{bmatrix} V_{GNSS} \\ V_{Robot} \\ V_{PlumbLine} \end{bmatrix} = \begin{bmatrix} A_{GNSS} \\ A_{Robot} \\ A_{PlumbLine} \end{bmatrix} X - \begin{bmatrix} L_{GNSS} \\ L_{Robot} \\ L_{PlumbLine} \end{bmatrix};$$

and
the comprehensive weight matrix P is expressed as follows:

$$P = \begin{bmatrix} P_{GNSS} & 0 & 0 \\ 0 & P_{Robot} & 0 \\ 0 & 0 & P_{PlumbLine} \end{bmatrix},$$

wherein
$P_{GNSS}$ represents a weight matrix of the GNSS observed values; $P_{Robot}$ represents a weight matrix of the observed values of a measurement robot; and $P_{PlumbLine}$ represents a weight matrix of the observed values of the inverted plumb line displacement.

2. A system for establishing a space-ground integrated real-time monitoring reference for dam deformation, used to implement the method for establishing a space-ground integrated real-time monitoring reference for dam deformation according to claim 1, comprising a space-based Beidou system, a ground-based measurement robot system, a ground-based inverted plumb line system, an on-site intelligent observation station and a monitoring center, wherein
the space-based Beidou system transmits a dynamic reference point position of a dam deformation area obtained in real time to the monitoring center through the on-site intelligent observation station;
the ground-based measurement robot system transmits a spatial relative reference point position of the dam deformation area obtained in real time to the monitoring center through the on-site intelligent observation station;
the ground-based inverted plumb line system transmits a static gravity reference point position of the dam deformation area obtained in real time to the monitoring center through the on-site intelligent observation station; and
the monitoring center performs data fusion on the dynamic reference point position, the spatial relative reference point position and the static gravity reference point position to obtain a monitoring reference value of the dam deformation area, and transmits control instructions to the space-based Beidou system, the ground-based measurement robot system and the ground-based inverted plumb line system.

3. The system for establishing a space-ground integrated real-time monitoring reference for dam deformation according to claim 2, further comprising an integrated observation pillar, wherein the integrated observation pillar is fixedly arranged in the dam deformation area, and a BDS/GNSS receiver of the space-based Beidou system is fixed at a top of the integrated observation pillar;

the ground-based measurement robot system comprises an observation station point, reference points and monitoring points, wherein the observation station point is established on a stable foundation according to a dam deformation area condition, a measurement robot automatic observation system is mounted on the observation station point, and the measurement robot automatic observation system is arranged on one side of the integrated observation pillar;

the stable reference points are evenly established according to the dam deformation area condition, each reference point is equipped with a single-prism group exactly facing the observation station point, and directions and distances from the observation station point to all the reference points cover the entire dam deformation area;

the monitoring points are evenly arranged on the dam deformation area according to a section, and one or more single-prism groups or 360° prism groups exactly facing the observation station point is or are mounted on each monitoring point; and the ground-based inverted plumb line system is arranged on the other side of the integrated observation pillar, and an inverted plumb line of the ground-based inverted plumb line system is deeply buried in foundation bedrock in the dam deformation area through a vertical borehole.

4. The system for establishing a space-ground integrated real-time monitoring reference for dam deformation according to claim 3, further comprising a protective room, wherein the integrated observation pillar is arranged in the protective room, and the top of the integrated observation pillar extends out of the protective room upwards; the measurement robot automatic observation system and the ground-based inverted plumb line system are located in the protective room; and the on-site intelligent observation station is arranged in the protective room.

5. The system for establishing a space-ground integrated real-time monitoring reference for dam deformation according to claim 4, wherein the space-based Beidou system, the ground-based measurement robot system and the ground-based inverted plumb line system communicate with corresponding on-site intelligent observation stations through corresponding protocol conversion modules respectively; and several on-site intelligent observation stations are networked in an optical fiber Ethernet mode.

6. The system for establishing a space-ground integrated real-time monitoring reference for dam deformation according to claim 5, wherein all apparatuses in the monitoring center are connected to a permanent power supply in a plant room, and an uninterruptible power supply (UPS) is used as an emergency power supply for supplying power; the on-site intelligent observation stations, the space-based Beidou system, the ground-based measurement robot system and the ground-based inverted plumb line system are connected to the permanent power supply nearby, and corresponding distribution boxes and cabinets are grounded and connected to a grounding grid of a power station nearby;

copper strips are welded to steel pipes at different positions of the on-site intelligent observation stations, the space-based Beidou system, the ground-based measurement robot system and the ground-based inverted plumb line system, and used as grounding points; and copper strip extension lines are used for towing other apparatuses without grounding points of the on-site intelligent observation stations, the space-based Beidou system, the ground-based measurement robot system and the ground-based inverted plumb line system, and used as grounding points.

* * * * *